United States Patent
Lukac et al.

(10) Patent No.: US 8,562,059 B2
(45) Date of Patent: Oct. 22, 2013

(54) SEAT FOR A BI-DIRECTIONAL WORK VEHICLE

(75) Inventors: J. Bradley Lukac, St. John, IN (US);
John C. Campbell, Bettendorf, IA (US);
Kyle J. Brenner, Silvis, IL (US);
Matthew A. McCullough, Walcott, IA (US)

(73) Assignee: CNH America LLC, New Holland, PA (US)

( * ) Notice: Subject to any disclaimer, the term of this patent is extended or adjusted under 35 U.S.C. 154(b) by 167 days.

(21) Appl. No.: 13/206,477

(22) Filed: Aug. 9, 2011

(65) Prior Publication Data

US 2013/0038106 A1    Feb. 14, 2013

(51) Int. Cl.
*B60N 2/38* (2006.01)
*B60N 2/02* (2006.01)
*B60N 2/12* (2006.01)
*B60N 2/10* (2006.01)

(52) U.S. Cl.
USPC .................. 296/65.06; 296/65.01; 296/65.05; 296/65.11

(58) Field of Classification Search
USPC ............... 296/64, 65.01, 65.05, 65.06, 65.11; 297/129, 313, 331, 332, 337, 344.21, 297/344.24
See application file for complete search history.

(56) References Cited

U.S. PATENT DOCUMENTS

| | | | |
|---|---|---|---|
| 1,578,676 A | 3/1926 | Morgan | |
| 2,604,925 A | 7/1952 | Swift | |
| 4,372,607 A | 2/1983 | Mizushima et al. | |
| 4,480,867 A | 11/1984 | Ezell et al. | |
| 7,048,330 B2* | 5/2006 | Daniel | 297/15 |
| 7,165,801 B2* | 1/2007 | Tame et al. | 296/65.09 |
| 7,219,946 B2 | 5/2007 | Tame et al. | |
| 7,452,033 B2* | 11/2008 | Ma et al. | 297/336 |
| 7,648,186 B2* | 1/2010 | Ukai et al. | 296/65.06 |
| 8,091,945 B2* | 1/2012 | Hancock et al. | 296/65.06 |
| 2004/0124682 A1* | 7/2004 | Daniel | 297/331 |
| 2008/0143161 A1* | 6/2008 | Ayabe | 297/344.24 |
| 2013/0038106 A1* | 2/2013 | Lukac et al. | 297/329 |

FOREIGN PATENT DOCUMENTS

| | | | |
|---|---|---|---|
| EP | 0123897 A2 | 11/1984 | |
| JP | 58026642 A | 2/1983 | |
| JP | 03178838 A | 8/1991 | |
| JP | 2004142479 A | 5/2004 | |

\* cited by examiner

*Primary Examiner* — Glenn Dayoan
*Assistant Examiner* — Gregory Blankenship
(74) *Attorney, Agent, or Firm* — Sue C. Watson

(57) ABSTRACT

An improved mechanism for a movable seat for use on a bi-directional work vehicle that laterally shifts the lower seating surface as it is pivoted between raised and lowered positions to increase clearance adjacent to the seat to improve operator ingress and egress to the vehicle operator platform. The incorporation of a biasing mechanism enables the seat mechanism to automatically reposition the seat for maximum ingress/egress clearance when the vehicle operator rises from the seat.

17 Claims, 4 Drawing Sheets

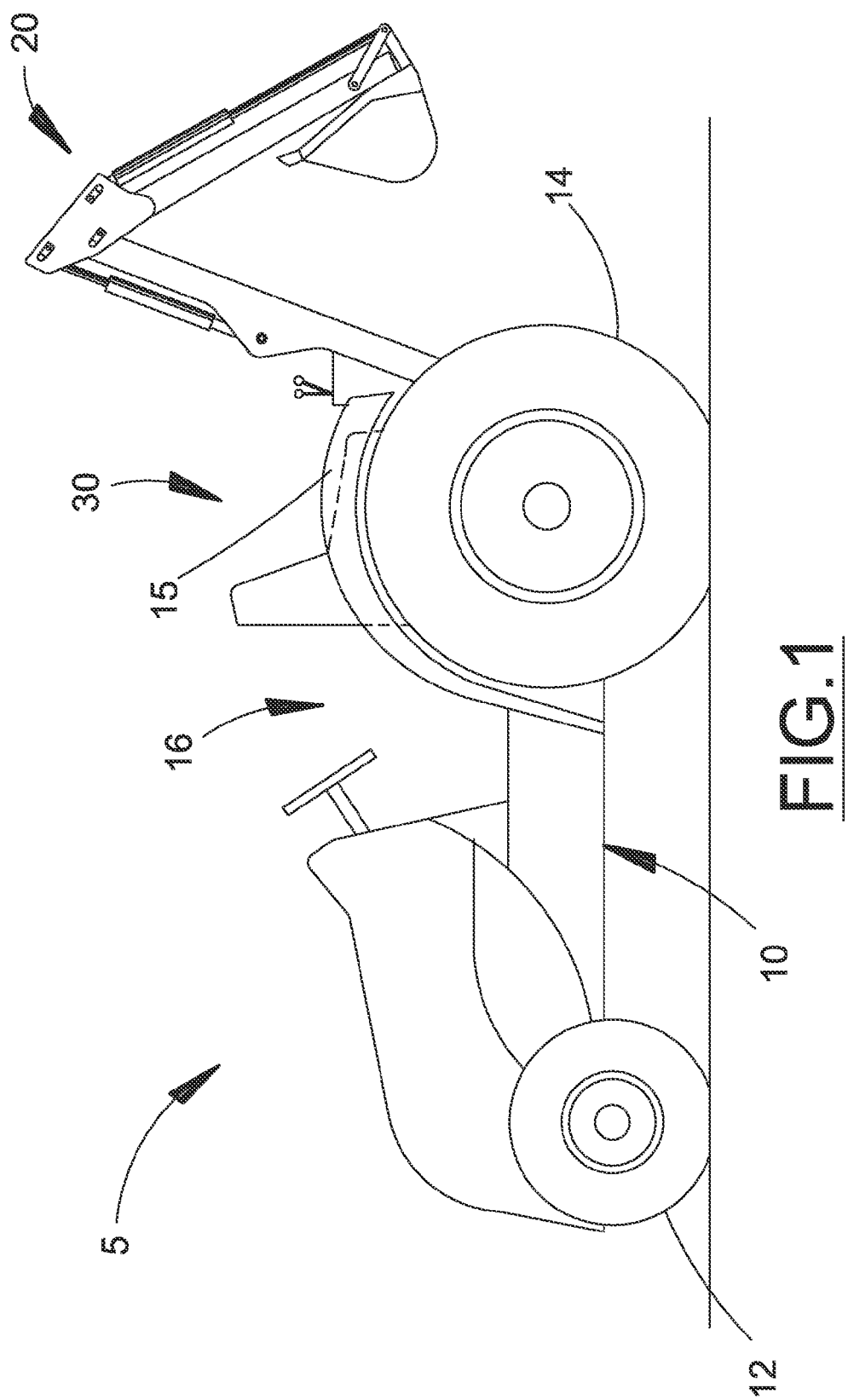

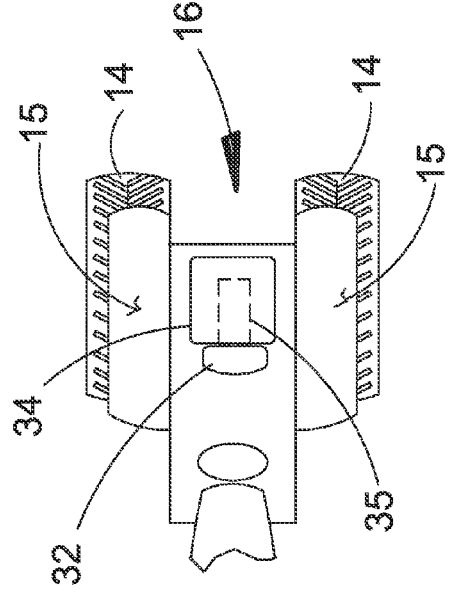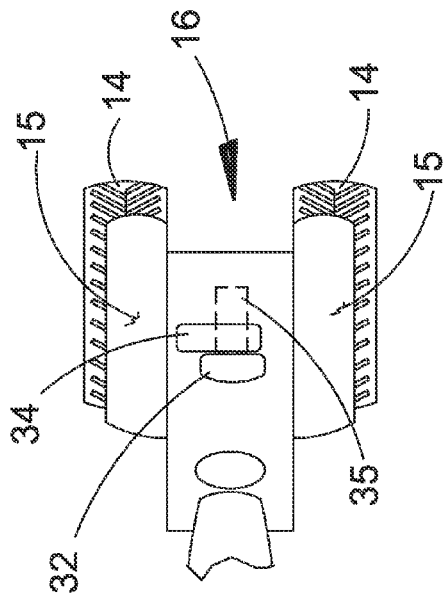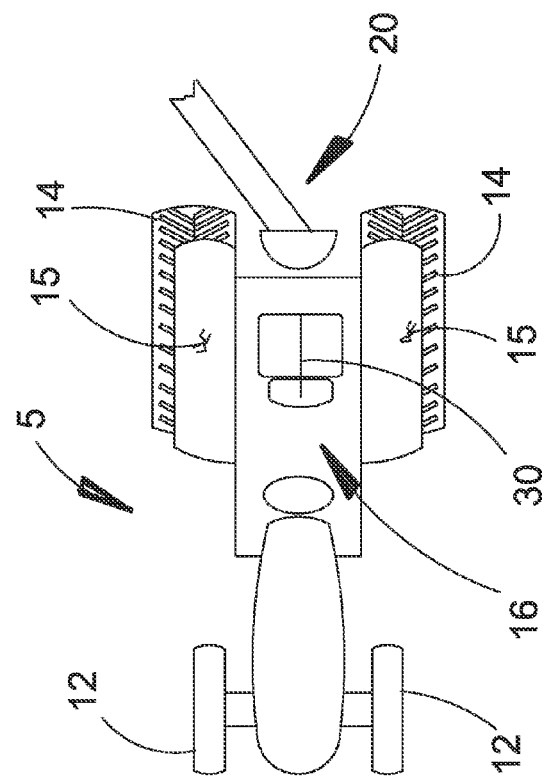

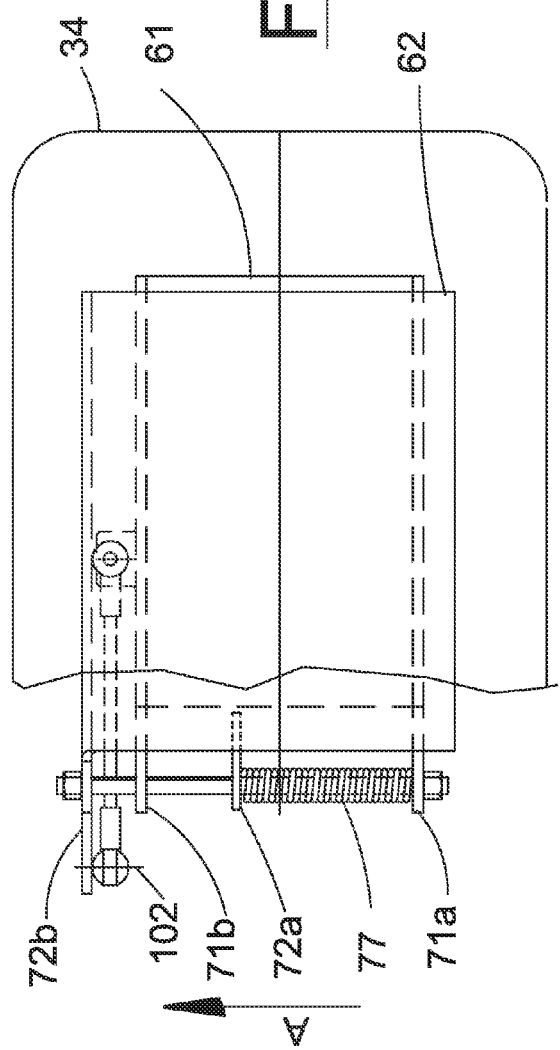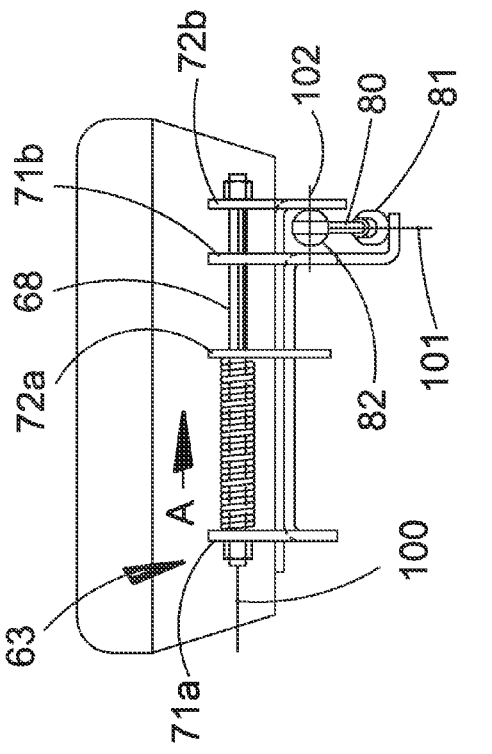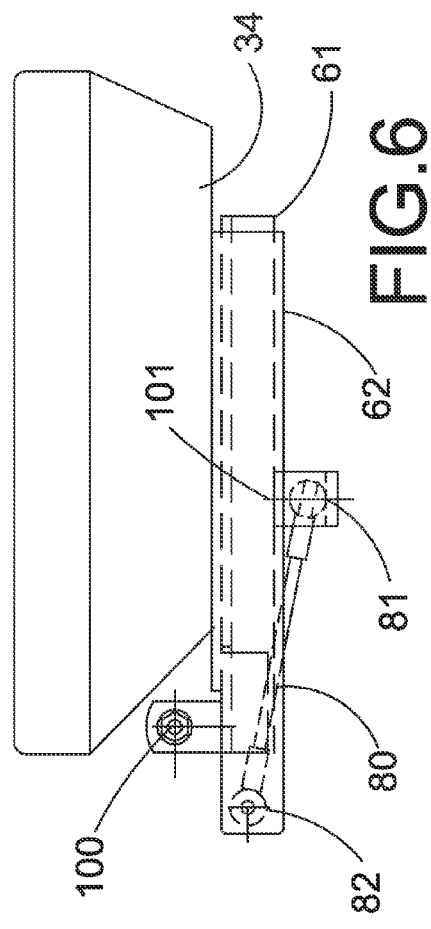

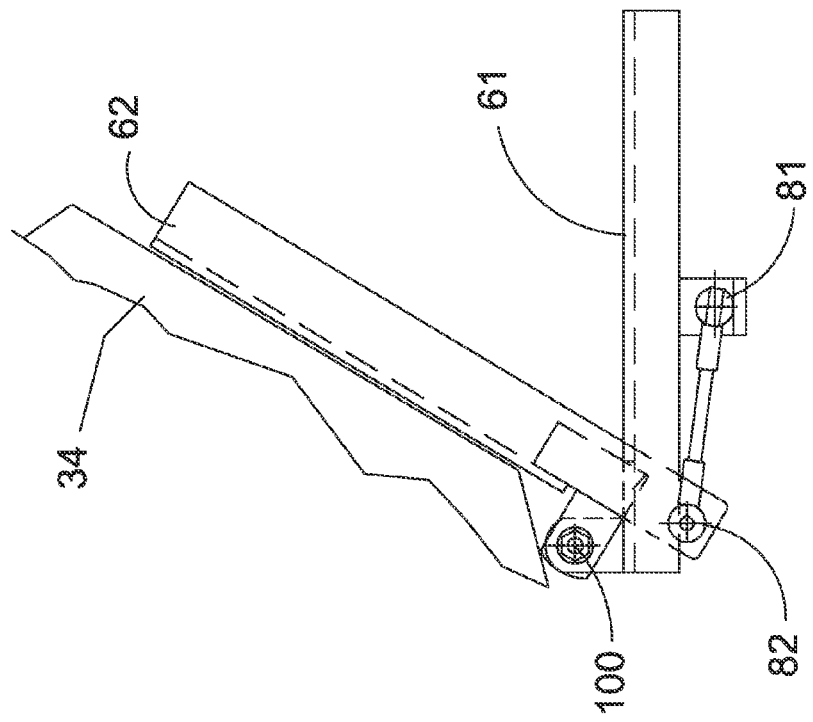
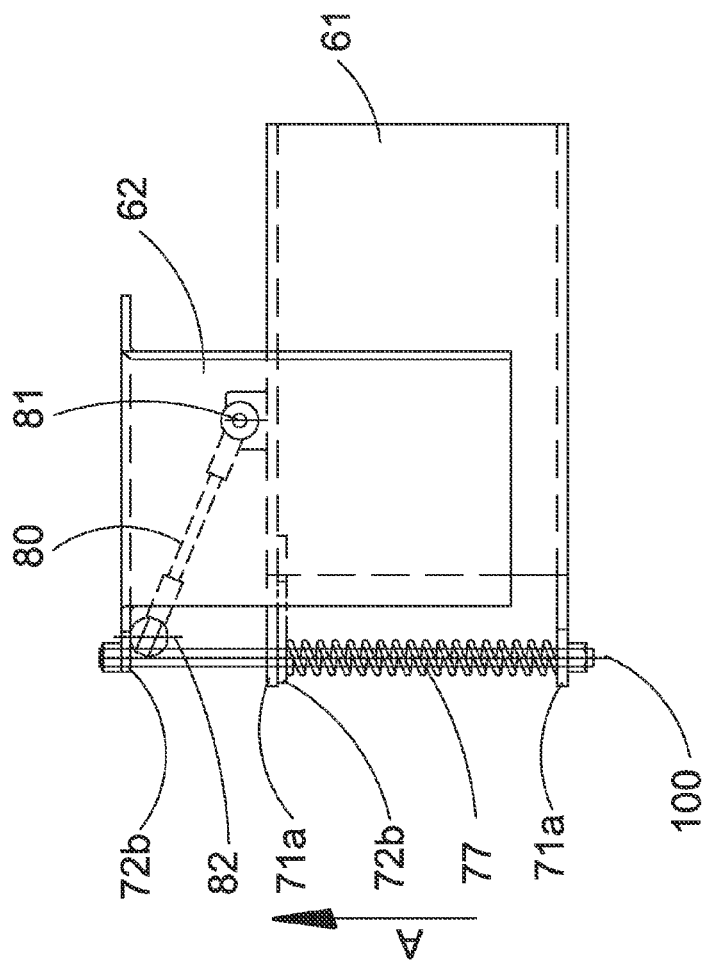

SEAT FOR A BI-DIRECTIONAL WORK VEHICLE

BACKGROUND OF THE INVENTION

The present invention relates to operator seats for bi-directional work vehicles and, more particularly, to a mechanism for automatically repositioning an operators seat to provide clearance for operator egress from the work vehicle when the seat is not occupied.

Many work vehicles, such as a tractor with a rear mounted backhoe, are operated by from a single operator location having a seat offering multiple seating positions. At least seat one position is required allow the operator to face forward for front forward operation of the vehicle and at least one seat position should face rearward to allow effective operation of a rear-mounted implement or for operation of the work vehicle in the rear-forward direction. Two seats could be provided to accomplish this objective, but a single, movable seat is more frequently employed.

An operator typically enters and exits the operator platform from a location ahead of the vehicle rear wheels. Space in the operator platform area may be limited on smaller work vehicles leaving little clearance for operator ingress/egress, especially on work vehicles having a relatively narrow rear wheel track measurement.

It would, therefore, be a great advantage to provide an improved mechanism for a movable seat for use on a bi-directional work vehicle that would not only allow the seat to be positioned for forward or rearward operation, but also be easily movable into a position that maximizes an operator ingress/egress path on the operator platform, especially when operating the vehicle in the rear-forward orientation. Still further advantages result from a moveable seat mechanism for a bi-directional work vehicle that automatically repositions the seat for increased operator ingress/egress clearance as an operator leaves the seat in preparation to exit the work vehicle.

SUMMARY OF THE INVENTION

Accordingly, the present invention, in any of the embodiments described herein, may provide one or more of the following advantages:

It is an object of the present invention to provide a seat mount for a bi-directional work vehicle that repositions the seat to increase operating platform ingress/egress clearance.

It is another object of the present invention to provide a seat mount for a bi-directional work vehicle that repositions the seat to increase operator platform ingress/egress clearance in response to an operator action.

It is a further object of the present invention to provide a seat mount for a bi-directional work vehicle that repositions the seat to increase ingress/egress clearance through a combination of translational and pivotal motion.

It is a further object of the present invention to provide a seat mount for a bi-directional work vehicle that pivots the seat cushion upwardly and shifts it laterally to increase accessible space on the operator platform of a work vehicle when the operator stands.

It is a still further object of the present invention to provide a seat mount for a bi-directional work vehicle that repositions the seat to increase ingress/egress clearance that is durable in construction, inexpensive of manufacture, carefree of maintenance, easily assembled, and simple and effective to use.

These and other objects are achieved by providing provide an improved mechanism for a movable seat for use on a bi-directional work vehicle that laterally shifts the lower seating surface as it is pivoted between raised and lowered positions to increase clearance adjacent to the seat to improve operator ingress and egress to the vehicle operator platform. The incorporation of a biasing mechanism enables the seat mechanism to automatically reposition the seat for maximum ingress/egress clearance when the vehicle operator rises from the seat.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a side elevation view of a tractor of the type on which the present invention is advantageous;

FIG. 2 is a plan view of the tractor of FIG. 1 illustrating the operator platform configured for rearward-facing operation;

FIG. 3 is an detail view of FIG. 2 showing one embodiment of the operator seat shown positioned for a tractor operation;

FIG. 4 is a detail view FIG. 2 showing the operator seat positioned to maximize platform clearance for operator ingress/egress;

FIG. 5 is a detail view of one embodiment of the mechanism for repositioning the operator seat, shown in the lowered positioned for tractor operation;

FIG. 6 is a side elevation view of the mechanism shown in FIG. 5;

FIG. 7 is an end view of the mechanism shown in FIG. 5;

FIG. 8 is a detail of the mechanism for repositioning the operator seat of FIG. 5, shown in the raised positioned to improve operator platform clearance for operator ingress/egress; and FIG. 9 is a side elevation view of the mechanism shown in FIG. 8.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "forward" or "rearward," "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring now to FIGS. 1 and 2 there is illustrated a compact tractor 5 typically used for such purposes as agriculture, earthmoving, construction, and the like. Tractor 5 includes a chassis 10 supported by front wheels 12 and by rear wheels 14 on either side thereof. An operator platform 16 is provided to enable an operator to control operation of the tractor. Rear fenders 15 may be provided to shield the operator platform 16 from debris thrown from rear wheels 14 during tractor operation.

A rear-mounted implement 20 may also be provided, such as a backhoe as illustrated in FIG. 1. It is common on such tractors to provide an operator's seat 30 which may be repositioned to face forward for operation of the tractor or rearward for operation of a rear-mounted implement. The seat 30 is shown forward-facing in FIG. 1 and rearward-facing in FIG. 2. It is known to provide a pivoting seat mount that enables the operator seat to be reoriented between forward and rearward facing directions.

Operator's seat 30 further comprises a back rest 32 and a seat rest 34 supported by a seat pedestal 35. The seat pedestal 35 is typically positioned atop the operator platform 16 and includes provisions, such as a seat mounting pedestal, that allow the seat position to be adjusted forwardly-rearwardly (along the tractor longitudinal axis) as well as pivoted to a forward facing or a rearward facing orientation. The seat 30, as illustrated in FIG. 3, is shown in a deployed position as it would be when an operator is seated. Lateral clearance between the lateral ends of seat rest 34 and the rear fenders 15 when the operator's seat 30 is in the deployed position is limited. Limited clearance may impede operator ingress and egress onto the platform, especially when the seat is oriented rear-facing. Further, the longitudinal extension of the seat rest 34 may limit access to the rear floor area of the operator platform 16 making it difficult for an operator to stand.

Referring to FIG. 4, the operator seat 30 incorporating one embodiment of the present invention is shown in a stowed position. In the stowed position, the seat rest 34 is pivoted upwardly about an axis adjacent to the intersection with and generally parallel to the plane of the back rest 32. As the seat rest 34 pivots upwardly, a mechanism 60 (see FIGS. 5 through 7) causes the seat rest 34 to simultaneously shift laterally to provide additional clearance between the seat 30 and one of the rear fenders 15 on the operator platform 16.

Mechanism 60 is shown in detail in FIGS. 5 through 7 and comprises a fixed base 61 and a movable base 62. Fixed base 61 and movable base 62 are connected by a hinge 63. Hinge 63 comprises a pair of spaced-apart base tabs 71a, 71b connected to the fixed base and a pair of spaced-apart movable tabs 72a, 72b connected to the movable base 62. The tabs 71, 72 are configured to receive a common shaft 68 in a manner to enable relative pivotal movement about the shaft axis 100 between the fixed base 61 and the movable base 62. Additionally, the tabs 71, 72 are spaced apart in a manner to allow relative axial movement along shaft axis 100 between the fixed base 61 and the movable base 62. A spring 77 positioned between a first fixed base tab 71a and a first movable tab 72a biases lateral movement of the movable base 62 in a first direction, shown by arrow "A" in FIGS. 5 and 7.

Lateral movement of the movable base 62 is coordinated with pivotal position by a link 80 interconnecting mounting points 81, 82 on the fixed base 61 and moveable base 62, respectively. The length of link 80 remains fixed during use, but may include provisions for adjustment. The connections between link 80 and mounting points 81, 82 are sufficiently flexible to allow multiple degrees of movement (e.g. rotational about the pivoting axes and angular deflection from the pivoting axes) through the preferred use of spherical joints as shown. The orientation of the mounting point connections, shown by pivoting axes 101, 102, may also be altered to provide optimal orientation for the spherical bearing alignment.

The fixed length of link 80 causes the moveable base 62 to move laterally in the first direction "A" as it pivots in a first direction away from the position shown in FIGS. 5 through 7 toward the position shown in FIGS. 8 and 9. Movement of the movable base 62 in the opposite direction results in lateral movement toward the position shown in FIGS. 5 through 7. The effect of the bias toward the raised position shown in FIGS. 8 and 9 provided by spring 77 is to maintain the movable base 62 in a normally raised position which maintains the seat rest 34 in a position to maximize available clearance between the operator seat 30 and the fenders 15. The spring 77 rate is selected so that an operator can easily overpower the spring force to lower the seat rest 34 and sit on the seat 30. Upon standing by the operator, the seat rest 34 returns to the raised position to maximize space on the operator platform 16 so the operator can more easily exit or move around on the platform. While shown as a helical spring acting between a pair base tabs 71, 72, any mechanism applying a force on the movable base to bias it toward the raised position will accomplish the same result and is anticipated by the present invention.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

What is claimed is:

1. A mechanism for a moveable seat on a work vehicle comprising:
    a mounting base connected to the work vehicle;
    a moveable mount connected to said mounting base, said moveable mount configured for pivotal movement about a pivot axis between generally opposing raised and lowered positions, and further configured for axial movement along said pivotal axis between generally opposing first and second positions; and
    a link interconnecting said mounting base and said moveable mount, said link configured to coordinate axial movement of said moveable mount with pivotal movement so that as said moveable mount is pivoted toward said raised position, said movable mount axially moves toward said second position, and as said moveable mount is pivoted toward said lowered position, said moveable mount axially moves toward said first position.

2. The mechanism of claim 1, further comprising a biasing element configured to bias the position of said moveable mount toward said raised and said second position.

3. The mechanism of claim 2, further comprising a lower seat and a back rest, said lower seat connected to said moveable mount for movement therewith, and said back rest being fixed in relation to said mounting base.

4. The mechanism of claim 3, wherein said biasing element is configured to move said moveable mount toward said raised position in the absence of a vehicle operator's weight on said lower seat.

5. The mechanism of claim 4, wherein said biasing element is a spring.

6. The mechanism of claim 1, wherein said link has a length that remains constant during movement of said moveable mount.

7. A moveable seat for location on an operator platform of a work vehicle comprising:
    a mounting base connected to the work vehicle, said mounting base configured to support a lower seating surface for a vehicle operator;
    a moveable mount connected to said mounting base and supporting a seat rest surface for the vehicle operator, said moveable mount configured for pivotal movement about a pivot axis between generally opposing raised and lowered positions, and further configured for axial movement along said pivotal axis between generally opposing first and second positions; and a link interconnecting said mounting base and said moveable mount, said link configured to coordinate axial movement of said moveable mount with pivotal movement so that as said moveable mount is pivoted toward said raised position, said movable mount axially moves toward said second position to shift said lower seating surface laterally to maximize space for vehicle operator movement on the operator platform, and as said moveable mount is pivoted toward said lowered position, said moveable mount axially moves toward said first position to provide a seat for the vehicle operator.

8. The moveable seat of claim 7, further comprising a biasing element configured to bias the position of said moveable mount toward said raised and said second position whereby said lower seating surface is positioned to minimize interference with vehicle operator movement on the operator platform.

9. The moveable seat of claim 8, wherein said biasing element is configured to move said moveable mount toward said raised position in the absence of the vehicle operator's weight on said lower seating surface.

10. The moveable seat of claim 9, wherein said biasing element is a spring.

11. The moveable seat of claim 7, wherein said link has a length that remains constant during movement of said moveable mount.

12. A method for improving vehicle operator ingress and egress clearance on an operator platform of a work vehicle, the operator platform having a seat supported by a seat pedestal configured for bi-directional operator control orientation and a width defined by a pair of spaced-apart vehicle fenders, the method comprising the steps of:

providing a mounting base connected to the seat pedestal, the mounting base configured to support a lower seating surface for the vehicle operator;

providing a moveable mount connected to the mounting base and supporting a seat rest surface for the vehicle operator, the moveable mount configured for pivotal movement about a pivot axis between generally opposing raised and lowered positions, and further configured for axial movement along the pivotal axis between generally opposing first and second positions;

providing a link interconnecting the mounting base and the moveable mount, the link configured to coordinate axial movement of the moveable mount with pivotal movement;

pivoting the lower seating surface toward the raised position; and axially moving along the pivotal axis by the link the lower seating surface toward the second position to shift the lower seating surface laterally to minimize interference with vehicle operator movement on the operator platform.

13. The method of claim 12, further comprising the steps of:

pivoting the lower seating surface toward the lowered position; and axially moving along the pivotal axis by the link the lower seating surface toward the first position to shift the lower seating surface laterally to provide a seat for the vehicle operator.

14. The method of claim 13, further comprising the step of:

providing a biasing element configured to bias the position of the moveable mount toward the raised and said second position; whereby said lower seating surface is positioned to minimize interference with vehicle operator movement on the operator platform.

15. The method of claim 14, wherein the biasing element is configured to move the moveable mount toward the raised position in the absence of the vehicle operator's weight on the lower seating surface.

16. The method of claim 15, wherein the biasing element is a spring.

17. The method of claim 15, wherein the link has a length that remains constant during movement of the moveable mount.

* * * * *